United States Patent Office 2,757,189
Patented July 31, 1956

2,757,189

METHOD OF PRODUCING POLYORGANO-SILOXANES

Hermann Clasen and Anita Kahles, Frankfurt am Main, Germany, assignors to Metallgesellschaft, A. G., Frankfurt am Main, Germany No Drawing. Application October 26, 1953, Serial No. 388,428

Claims priority, application Germany November 6, 1952

13 Claims. (Cl. 260—448.2)

This invention relates to the production of polyorganosiloxanes from organosilanes having Si—H and/or Si—Si bonds.

It is known that dimethylsilane $(CH_3)_2SiH_2$ when shaken for hours with a 30% solution of caustic soda yields, with the evolution of two volumes of hydrogen, a slightly turbid solution from which, after acidification with hydrochloric acid, an oil can be separated. Isobutyl silane has also been subjected to hydrolysis with a mixture of ether, ice and caustic soda solution, and upon separation of the ether layer and evaporation of the ether therefrom an oil was obtained which could be burnt to form silica. These oils are probably polyorganosiloxanes.

It has moreover been proposed to hydrolyse hydrolysable silanes with the aid of a water-miscible solvent, such as, for example, alcohol, dioxane, acetic acid or acetone.

It has now, however, been ascertained that when using organosilanes with Si—H and/or Si—Si bonds, no hydrolysis occurs under these conditions, since hydrolysis would be easily recognisable through the generation of hydrogen. In addition, although most solvents miscible with water are, when anhydrous, suitable solvents for alkyl silanes with Si—H bonds, nevertheless separation of the mixture occurs immediately on the addition of water with the formation of an aqueous phase and a solvent phase containing the silane. Alkanols, particularly methyl alcohol, are the only exception.

The speed of the generation of hydrogen in the alkaline decomposition of trialkylsilanes in solutions produced from ethyl alcohol, potassium hydroxide or sodium alcoholates and varying amounts of water, has already been investigated and it has been assumed that silanols can be produced by a process of this type.

It has now been found that polyorganosiloxanes can be produced from organosilanes which have the characteristic silane-bonds, that is Si—H and/or Si—Si bonds, by treating them with liquid mixtures of alcohol, preferably methanol, water and ammonia, condensing, if desired, by heating, and removing the alcohol, ammonia and water, preferably by evaporation. If desired, the hydrolysis can be carried out only to a predetermined degree and the reaction product subjected to an oxidation process. The speed of hydrolysis can be regulated by the temperature and the concentrations of ammonia and water.

The process of the present invention offers substantial advantages over known processes. In contradistinction to the use of caustic soda solution, no acidification or extraction with ether is necessary when ammonia is used. A physical separation, preferably evaporation, is all that is required. The substances separated by evaporation, that is to say ammonia, methanol and water can be condensed and reused. The result is that the hereindescribed process renders it possible to convert organosilanes having Si—H or Si—Si bonds into polysiloxanes in a very rapid and simple manner without losses of auxiliary substances. The yields are approximately quantitative. Since, when employing ammonia, no acidification or extraction with ether is necessary, there are no losses through the solubility of silanols or their alkali metal salts in water or through the sparing solubility of a part of the polysiloxanes formed in ether. Polysiloxanes absolutely free from acid can be produced.

It is entirely unexpected that rapid hydrolysis can be achieved with ammonia; since although, for example, a 10% solution of caustic soda exhibits intense generation of gas at the surface of contact with diethylsilane at ordinary temperature no generation of gas is observed when using a concentrated aqueous solution of ammonia instead of the caustic soda solution. On the other hand, such generation of gas occurs as soon as a drop of methanol is added to the mixture containing concentrated ammonia. The speed of reaction can then be further increased, to the same extent as when a caustic soda solution is used, by using an amount of methanol necessary for the dissolution of the entire amount of organosilane.

In the process of the present invention methanol thus acts as a solvent for the alkylsilanes, the water necessary for the hydrolysis and the ammonia, so that a considerable speed of hydrolysis is achieved in the homogeneous phase even with the weak base, ammonia.

In the hydrolysis according to the present invention, the Si—H or Si—Si bonds are apparently converted directly into the Si—OH bonds with the generation of hydrogen, without the formation of alkoxy compounds. It is naturally essential that sufficient water should be present. When using anhydrous alcohol, it is known that the Si—H or Si—Si bonds are converted to alkoxy bonds when sodium ethylate is used as catalyst.

The principle underlying the present invention can also serve for the rapid quantitative determination of the Si—H and Si—Si content in organosilanes by the determination of hydrogen or weighing out the polysiloxane. Since, in contradistinction to alkylhydrogensilanes, unsubstituted silanes are already rapidly converted into silicic acid by ammoniacal water, gas analyses of gases containing silanes and alkyl silanes can be conveniently carried out.

All organosilanes having Si—H and Si—Si bonds are suitable for use in carrying out the hereindescribed process. The organic radicals can, for example, be alkyl, chloralkyl, aryl, acetyl, and so on. If in addition to Si—H and Si—Si, other hydrolysable groups are also present on the Si, such as for example, Cl, OR, or OCOR, the hereindescribed hydrolysis can in general be carried out to produce siloxane bridges, Si—O—Si, on the hydrolysable groups also. If acids are produced by the hydrolysis, it may be necessary to add further ammonia to the reaction mixture, since no hydrolysis of the Si—H and Si—Si bonds occurs in the acid or neutral medium. If, for example,

is present, and if it is desired to obtain the largest possible siloxane molecules, it is convenient to complete the hydrolysis of the chlorine atoms and the condensation first in an acid medium and thereupon to carry out the hydrolysis of the hydrogen atoms and condensation in a basic medium.

Besides methanol, other alcohols can also be used, such as, for example, ethyl alcohol, propyl alcohol, ethylene glycol, glycerine, and so forth. However, methanol is usually more effective and is moreover more volatile and less expensive, and ethylene glycol and glycerine are, for example, only poor solvents for the alkyl silanes. In these cases it is convenient to add a further solvent, for example, ether.

By suitable selecting the starting products and the reaction conditions, products having accurately predetermined properties can be obtained. For example, by adding inadequate amounts of ammonia or water or by prematurely distilling-off the solvents, products can be obtained which can still generate hydrogen with further amounts of ammonia, i. e. which still have Si—H or Si—Si bonds. These substances are, for example, hardenable by heating in air, because the Si—H bonds are converted into SiOSi bridges by oxygen. Thus, for example, the viscosity of a polysiloxane oil can be increased to a desired degree. Polysiloxanes which still contain Si—H bonds can also be hardened by simply heating with the exclusion of air, apparently because Si—Si bridges are formed by the giving-up of hydrogen.

According to one embodiment of the invention the hydrolysing medium, i. e. water and/or ammonia, is added slowly to the alkanol solution of the organosilanes while effecting thorough mixing. Thus, for example, ammonia gas, in certain circumstances also diluted with an inert gas such as nitrogen, can be introduced into the aqueous-alkanol solution, or water may be added dropwise to the alkanol solution saturated with ammonia gas. If, for example, the starting material is dialkylmonosilane

monosilanol

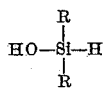

is first mainly produced, which has time to condense into siloxanes

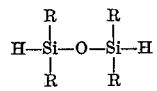

which then on the further addition of the hydrolysing medium are mainly hydrolysed only into monosilanols, so that finally large yields of linear polysiloxanes of high molecular weight are obtained. With rapid hydrolysis the high concentration of hydrolysis media results in very large amounts disilanols

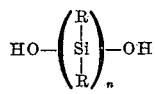

(where $n \geq 3$), which can easily condense into cyclic siloxanes of low molecular weight. Accordingly, in the slow hydrolysis of the present invention substances of higher viscosity in the homogeneous phase are produced than in the homogeneous phase with rapid hydrolysis.

For the production of polysiloxanes, the starting materials as is known, are generally alkylchlorosilanes, which can very easily be hydrolysed. The hydrolysis produces hydrochloric acid. In the process of the present invention, alkylpolysiloxanes can be just as easily produced from the alkyl silanes, which have recently become readily available through the reaction of silanes with, for example, ethylene, in which process hydrochloric acid is neither produced nor needed, so that the products obtained are absolutely free from hydrochloric acid and can be used, for example, for sensitive textiles.

It has been found that the hydrolysis speeds, when carrying out the hydrolysis in accordance with the present invention, are markedly different from one another for compounds of the types $R_3SiH$, $R_2SiH_2$, $RSiH_3$ (R for example $C_2H_5$), in contradistinction to the corresponding chlorine compounds $R_nSiCl_{4-n}$, for which the speeds of hydrolysis are approximately equal. Every alkyl hydrogen component of a mixture therefore for the greater part, hydrolyses and condenses independently. Therefore, in the hydrolysis of the hydrogensilanes, larger siloxane molecules are obtained than in the hydrolysis of the chlorine compounds, in which for example the compound $R_3SiCl$ acts noticeably as a chain interrupting member in the siloxanisation of $R_2SiCl_2$. Moreover, since as is known, a separation of the alkyl silanes is easier, owing to greater boiling point differences, than that of the alkylchlorosilanes, linear polysiloxanes of high molecular weight and having the known valuable properties can, for example, be obtained more easily for the same reason.

The process of the present invention is very simple to carry out.

*Example 1*

1.28 g. of a fraction boiling at 53 to 57° C. obtained in the reaction of silanes with ethylene at 450° C., and consisting substantially of diethylmonosilane, were dissolved in 10 cc. of technical methanol, and 8 cc. of concentrated aqueous ammonia solution were added with cooling. A hardly noticeable turbidity occurred temporarily at first, together with intense generation of gas, and an oil layer was formed at once. The mixture can be boiled under reflux for a further hour. No further hydrogen was generated on the addition of caustic soda solution or further ammonia. After distilling off the methanol and water and heating for 24 hours in the drying cabinet, 1.13 g. of polysiloxane oil was obtained. The oil can be used as lubricating oil for hot machine parts.

*Example 2*

2 g. of the light yellow solid reaction product obtained in the reaction of monosilane with ethylene at 520° C., composed of $(SiCH_3)_n$, was put with stirring into a mixture of propylalcohol and aqueous concentrated ammonia. The mixture was boiled under reflux and further stirring until no further hydrogen was generated on addition of potassium hydroxide solution. When heating is continued it may be necessary to add further ammonia at intervals. After distilling off the propylalcohol, the ammonia and water, a white silica-like product remained, consisting of methylpolysiloxane.

*Example 3*

10 g. of the oily reaction product from the thermic reaction of mono- and disilane at 500° C. with ethylene, which no longer is capable of distilling at normal pressure, which contains, as generally known, different alkylsilanes, having Si—H as well as Si—Si bonds, were dissolved in 1,6-hexanediol containing a little water and hydrolysed by adding ammonia gas. At normal room temperature the generation of hydrogen was finished after four hours. After distilling off the 1,6-hexanediol and water a sticky resinuouslike substance remained which hardened on heating in air.

*Example 4*

5 cc. of fluid monoethylsilane (boiling point −14° C.), obtained by addition of ethylene to monosilane at 300° C. and a pressure of 300 atmospheres was put into a mixture of methanol, water and ammonia at −80° C. The temperature was kept for two hours at −20° C., during which hydrolysis was produced with intensive generation of hydrogen. An oily layer of ethylpolysiloxane formed on the surface of the methanol which was separated. As the hydrolysis was not yet finished after two hours, this product can be solidified by adding mercury oxide at normal temperature or more rapidly at slightly increased temperature owing to further oxidation.

*Example 5*

3 g. dimethylmonochlormonosilane $(CH_3)_2SiHCl$ were dissolved in cooled ether and poured into ice water in a thin stream. After the heat of reaction caused by the hydrolysis of the SiCl bonds had vanished, the hydrochloric acid formed was neutralized by adding ammonia and methanol and the slow addition of ammonia was continued until the hydrogen generation caused by the hydrolysis of the Si—H bonds ceased. The solvent and ammonia were evaporated and a viscid dimethylpolysiloxane was obtained. This substance can be transformed into silicon-rubber by known methods.

The term "polyorganosiloxanes" as used herein is intended to denote siliconorganic compounds containing SiOSi structural elements.

The products produced by the hereindescribed process can, as already mentioned, be obtained with widely variable physical properties. They have a wide field of application, for example, in the production of damping oils, pump oils, lubricating agents, stopcock grease, in the lacquer industry, for electrical and thermal insulation, for heat-resistant packings, corrosion-proof coatings, temperature-resistant packings, elastic mouldings, and so forth.

We claim:

1. A method of producing polyorganosiloxanes from organosilanes which comprises hydrolysing an organosilane containing at least one of the characteristic silane-bonds SiH and Si—Si in a liquid mixture of a water soluble alcohol, water and ammonia.

2. The method of claim 1, wherein said alcohol is methanol.

3. A method of producing polyorganosiloxanes from organosilanes which comprises hydrolysing an organosilane containing at least one of the characteristic silane bonds Si—H and Si—Si in a liquid mixture of a water soluble alcohol, water and ammonia, and condensing the hydrolysed product.

4. The method of claim 3, wherein the condensation of the hydrolysed product is effected by heating.

5. The method of claim 3, wherein the water, alcohol and ammonia are removed from the condensation product by evaporation.

6. The method of claim 3, in which the hydrolyzation is terminated before all of the Si—H and Si—Si bonds present are hydrolysed and the condensation product is subjected to an oxidation process.

7. The method of claim 1, in which at least one of the materials alcohol, water and ammonia is removed from the liquid mixture to terminate the hydrolysis before all of the Si—H and Si—Si bonds present are hydrolysed.

8. The method of claim 1, in which at least one of the components water and ammonia is added slowly to said liquid mixture to slow the course of said hydrolysis.

9. The method of claim 1, in which at least one of the components water and ammonia is added slowly to said liquid mixture to slow the course of said hydrolysis and the amount of alcohol suffices to keep the organosilanes dissolved in the water and alcohol mixture.

10. The method of claim 3, in which at least one of the components water and ammonia is added slowly to said liquid mixture to slow the course of said hydrolysis and the condensation is carried out simultaneously with said hydrolysis.

11. The process of claim 1, in which said liquid mixture contains at least one further solvent for said organosilane.

12. A method of producing polyorganosiloxanes from organosilanes containing at least one of the bonds Si—H and Si—Si and at least one other hydrolysable radical, which comprises hydrolysing such organosilanes in a neutral to acid medium to effect hydrolysation of said other radical and thereupon hydrolysing any of the Si—H and Si—Si bonds present in a liquid mixture of a water soluble alcohol, water and ammonia, and condensing the hydrolysed product.

13. A method of producing polyorganosiloxanes from organosilanes containing at least one of the bonds Si—H and Si—Si and at least one other hydrolysable radical, which comprises hydrolysing such organosilanes in a neutral to acid medium to effect hydrolysation of said other radical, condensing the hydrolysed product, and thereupon hydrolysing any of the Si—H and Si—Si bonds present in a liquid mixture of a water soluble alcohol, water and ammonia and condensing the hydrolysed product.

References Cited in the file of this patent

UNITED STATES PATENTS

| | | |
|---|---|---|
| 2,595,890 | Sauer | May 6, 1952 |
| 2,628,213 | Rust | Feb. 10, 1953 |

OTHER REFERENCES

Price: "Jour. Am. Chem. Soc.," vol. 69 (1947), pages 2600–2604.